United States Patent [19]
Dahn et al.

[11] Patent Number: 6,143,268
[45] Date of Patent: Nov. 7, 2000

[54] HYDROCARBON TREATMENT OF CARBONACEOUS MATERIALS

[75] Inventors: Jeffery R. Dahn, Hubley; Eddie R. P. Buiel, Halifax, both of Canada

[73] Assignee: 3M Innovative Properties Company, St. Paul, Minn.

[21] Appl. No.: 08/949,677

[22] Filed: Oct. 14, 1997

[51] Int. Cl.$^7$ .................................................. C01B 31/00
[52] U.S. Cl. .................................... 423/445 R; 429/231.8
[58] Field of Search ............................... 423/460, 445 R, 423/449.2; 429/218, 231.8

[56] References Cited

U.S. PATENT DOCUMENTS

| | | | |
|---|---|---|---|
| 3,907,950 | 9/1975 | Bickerdike et al. | 423/445 R |
| 4,567,031 | 1/1986 | Riley | 423/593 |
| 5,084,366 | 1/1992 | Toyoguchi | 429/224 |
| 5,370,949 | 12/1994 | Davidson et al. | 429/224 |
| 5,540,741 | 7/1996 | Gozdz et al. | 29/623.5 |
| 5,658,692 | 8/1997 | Ohsaki et al. | 423/445 R |

FOREIGN PATENT DOCUMENTS

| | | |
|---|---|---|
| 0 624 552 A1 | 11/1994 | European Pat. Off. . |
| 808 7998 | 4/1996 | Japan . |
| 8298111 | 11/1996 | Japan . |
| 2 296 125 | 6/1996 | United Kingdom . |

OTHER PUBLICATIONS

Nagaura et al., "Lithium Ion Rechargeable Battery", *Progress in Batteries and Solar Cells*, vol. 9, pp. 209–217 (1990) no month.

Dahn et al., "Rechargeable LiNiO$_2$/Carbon Cells", *J. Electrochem. Soc.*, vol. 138, pp. 2207–2211 (1991) no month.

Ohzuku et al., "Electrochemistry of Manganese Dioxide in Lithium Nonaqueous Cell", *J. Electrochem. Soc.*, vol. 137, pp. 769–775 (1990) no month.

Reid, M., "Manganese Dioxide Rechargeable Lithium–Ion Battery", paper presented at Power '96, Santa Clara, California, Oct. 13–15, 1996, (9 pages).

Reimers et al., "Electrochemical and In Situ X–Ray Diffraction Studies of Lithium Intercalation in Li$_x$CoO$_2$", *J. Electrochem. Soc.*, vol. 139, pp. 2091–2097 (1992) no month.

Dahn et al., "Structure and Electrochemistry of Li$_{1\pm y}$NiO$_2$ and a New Li$_2$NiO$_2$ Phase With the Ni(OH)$_2$ Structure", *Solid State Ionics*, vol. 44, pp. 87–97 (1990) no month.

Gao et al., "Synthesis and Characterization of Li$_{1+x}$Mn$_{2-x}$O$_4$ for Li–Ion Battery Applications", *J. Electrochem. Soc.*, vol. 143, pp. 100–114 (1996) no month.

Gummow et al., "Improved Capacity Retention in Rechargeable 4 V Lithium/Lithium–Maganese Oxide (Spinel) Cells", *Solid State Ionics*, vol. 69, pp. 59–67 (1994) no month.

Ohzuku et al., "LiMnO$_2$ As Cathode for Secondary Lithium Cell", *Chemistry Express*, vol. 7, pp. 193–196 (1992) no month.

Reimers et al., "Synthesis and Electrochemical Studies of LiMnO$_2$ Prepared at Low Temperatures", *J. Electrochem. Soc.*, vol. 140, pp. 3396–3401 (1993) no month.

Koetschau et al., "Orthorhombic LiMnO$_2$ as a High Capacity Cathode for Li–Ion Cells", *J. Electrochem. Soc.*, vol. 142, pp. 2906–2910 (1995) no month.

Davidson et al., "Rechargeable Cathodes Based on Li$_2$Cr$_x$Mn$_{2-x}$O$_4$", *J. Power Sources*, vol. 54, pp. 205–208 (1995) no month.

David et al., "Structure Refinement of the Spinel–Related Phases of Li$_2$Mn$_2$O$_4$ and Li$_{0.2}$Mn$_2$O$_4$", *J. Solid State Chemistry*, vol. 67, pp. 316–323 (1987) no month.

Amine et al., "A New Three–Volt Spinel Li$_{1+x}$Mn$_{1.5}$Ni$_{0.5}$O$_4$ for Secondary Lithium Batteries", *J. Electrochem. Soc.*, vol. 143, pp. 1607–1613 (1996) no month.

Richard et al., "A Cell for In Situ X–Ray Diffraction Based on Coin Cell Hardware and Bellcore Plastic Electrode Technology", *J. Electrochem. Soc.*, vol. 144, pp. 554–557 (1997) no month.

Li et al., "Lattice–Gas Model Approach to Understanding the Structures of Lithium Transition–Metal Oxides Li/Mo$_2$", *Physical Review*, vol. 49, pp. 826–831 (1994) no month.

Armstrong et al., "Synthesis of Layered LiMnO$_2$ as an Electrode for Rechargeable Lithium Batteries", *Nature*, vol. 381, pp. 499–500 (1996) no month.

Murphy et al., "Ternary Li$_x$TiO$_2$ Phases from Insertion Reactions", *Solid State Ionics*, vols. 9 and 10, pp. 413–417 (1983) no month.

Reimers et al., "Structure and Electrochemistry of Li$_x$Fe$_y$Ni$_{1-y}$O$_2$", *Solid State Ionics*, vol. 61, pp. 335–344 (1993) no month.

Tarascon et al., "Li Metal–Free Rechargeable Batteries Based on Li$_{1+x}$Mn$_2$O$_4$ Cathodes ($0 \le x \le 1$) and Carbon Anodes", *J. Electrochem. Soc.*, vol. 138, pp. 2864–2868 (1991) no month.

Hewston et al., "A Survey of First–Row Ternary Oxides LiMO$_2$ (M = Sc–Cu)", *J. Phys. Chem. Solids*, vol. 48, pp. 97–108 (1987) no month.

Rossen et al., "Structure and Electrochemistry of Li$_x$Mn$_y$Ni$_{1-y}$O$_2$", *Solid State Ionics*, vol. 57, pp. 311–318 (1992) no month.

Rossen et al., "Synthesis and Electrochemistry of Spinel LT–LiCoO$_2$", *Solid State Ionics*, vol. 62, pp. 53–60 (1993) no month.

(List continued on next page.)

*Primary Examiner*—Steven P. Griffin
*Assistant Examiner*—Stuart L. Hendrickson
*Attorney, Agent, or Firm*—Daniel R. Pastirik

[57] ABSTRACT

A method for making a carbonaceous material suitable for use as an electrode composition that includes contacting pyrolyzed organic material with hydrocarbon gas for a period and at a temperature sufficient to produce a carbonaceous material characterized such that when the carbonaceous material is incorporated into an electrode composition of a lithium-ion cell, the cell exhibits a reversible capacity of at least about 400 mAH/g of carbonaceous material and an irreversible capacity no greater than about 140 mAH/g of carbonaceous material, the capacities being measured up to the point of plating of metallic lithium on the surface of the carbonaceous material.

34 Claims, 1 Drawing Sheet

OTHER PUBLICATIONS

Wiles et al., "A New Computer Program for Rietveld Analysis of X-ray Powder Diffraction Patterns", *J. Appl. Cryst.*, vol. 14, pp. 149–151 (1981) no month.

Dahn et al., "Mechanisms for Lithium Insertion in Carbonaceous Materials", *Science*, 270:590–593 (Oct. 1995).

Liu et al., "Mechanism of Lithium Insertion In Hard Carbons Prepared by Pyrolysis of Epoxy Resins", *Carbon*, 34(2):193–200 (1996) no month.

Takahashi et al., "Characteristics of Disordered Carbon Materials as Negative Electrodes for Lithium Rechargeable Batteries", 35th Battery Symposium in Japan, Nov. 14–16, Nugoya (1994) Abstract.

Sonobe et al., "Development of Carbon Materials as Anode Material for Lithium Ion Secondary Battery", 35th Battery Symposium in Japan, Nov. 14–16, Nugoya (1994) Abstract.

Fitzer et al., "The Formation of Glasslike Carbon by Pyrolysis of Polyfurfuryl Alcohol and Phenolic Resin", *Carbon*, 7:643–648 no month.

Zheng et al., "High–Capacity Carbons Prepared from Phenolic Resin for Anodes of Lithium–Ion Batteries", *J. Electrochem. Soc.*, 142(11):L211–L214 (Nov. 1995).

Xing et al., "Correlation Between Lithium Intercalation Capacity and Microstructure in Hard Carbons", *J. Electrochem. Soc.*, 143(11):3482–3419 (Nov. 1996).

Xing et al., "Optimizing Pyrolysis of Sugar Carbons for Use as Anode Materials in Lithium–Ion Batteries", *J. Electrochem. Soc.*, 143(10):3046–3052 (Oct. 1996).

Zheng et al., "Carbons Prepared From Coals for Anodes of Lithium–Ion Cells", *Carbon*, 34(12):1501–1507 (1996) no month.

Peled, "The Electrochemical Behavior of Alkali and Alkaline Earth Metals in Nonaqueous Battery Systems—The Solid Electrolyte Interphase Model", *J. Electrochem. Soc.*, 126(12):2047–2051 (Dec. 1979).

Fong et al., "Studies of Lithium Intercalation into Carbons Using Nonaqueous Electrochemical Cells", *J. Electrochem. Soc.*, 137(7):2009–2013 (Jul. 1990).

Xing et al., "Study of Irreversible Capacities for Li Insertion in Hard and Graphitic Carbons", *J. Electrochem. Soc.*, 144(4):1195–1201 (Apr. 1997).

Matsumura et al., "Mechanism Leading to Irreversible Capacity Loss in Li Ion Rechargeable Batteries", *J. Electrochem. Soc.*, 142(9):2914–2918 (Sep. 1995).

HYDROCARBON TREATMENT OF CARBONACEOUS MATERIALS

BACKGROUND OF THE INVENTION

The invention relates to preparing carbonaceous materials suitable for use as electrode compositions.

Lithium-ion cells frequently include a lithium intercalation compound, e.g., $LiCoO_2$, as the positive electrode and pyrolyzed carbonaceous materials such as carbon or graphite as the negative electrode. Lithium cells, which are used to evaluate properties (e.g., reversible and irreversible capacity) of carbonaceous materials, include lithium metal as the negative electrode and carbonaceous materials as the positive electrode. The pyrolyzed microporous and hard carbonaceous materials that are used in lithium and lithium-ion cells tend to have a high irreversible capacity.

In a lithium-ion cell, where discharge corresponds to removing lithium atoms from the carbonaceous material and charge corresponds to inserting lithium atoms into the carbonaceous material, irreversible capacity is a measure of the amount of lithium that cannot be fully recovered after the first charge (i.e., the amount of lithium that is irreversibly consumed). In a lithium cell, where discharge corresponds to inserting lithium into the carbonaceous material and charge corresponds to removing lithium from the carbonaceous material, irreversible capacity is a measure of the amount of lithium that cannot be fully recovered after the first discharge.

There are a number of mechanisms by which lithium can be consumed. For example, lithium can react with electrolyte at the carbon surface to form a "solid-electrolyte surface." It is theorized, additionally, that pyrolysis produces carbon atoms having sites available for reacting with air to form species, e.g., covalently bonded functional groups, chemisorbed species and physisorbed species.

Numerous efforts have been made to decrease the high irreversible specific capacity of pyrolyzed microporous carbonaceous materials, including conducting the pyrolysis process under inert atmospheric conditions such as, e.g., argon gas, helium gas, nitrogen gas, and under vacuum.

SUMMARY OF THE INVENTION

The invention features a method for making a carbonaceous material suitable for use as an electrode composition. The method includes contacting pyrolyzed organic material with hydrocarbon gas for a period and at a temperature sufficient to produce a carbonaceous material characterized such that when said carbonaceous material is incorporated into an electrode composition of a lithium-ion cell, the cell exhibits a reversible capacity of at least about 400 mAH/g of carbonaceous material and an irreversible capacity no greater than about 140 mAH/g of carbonaceous material, said capacities being measured up to the point of plating of metallic lithium on the surface of the carbonaceous material.

In preferred embodiments, the pyrolyzed organic material is contacted with hydrocarbon gas at a temperature of at least about 500° C., preferably at least about 700° C., more preferably at least about 900° C. In other preferred embodiments, the pyrolyzed organic material is contacted with hydrocarbon gas at a temperature between about 500° C. and about 1200° C., more preferably between about 700° C. and 1100° C., most preferably between about 900° C. and 1000° C.

The hydrocarbon gas preferably is selected from the group consisting of methane, ethane, propane, butane, ethylene, propylene, butylene, acetylene, benzene vapor, and combinations thereof.

The organic material preferably is selected from the group consisting of carbohydrates, phenolic resins (e.g., resole phenolic resins, novolac phenolic resins, and combinations thereof), epoxy resins, lignin, and combinations thereof. Carbohydrates are typically selected from the group consisting of glucose, sucrose, lactose, fructose, maltose, and combinations thereof. Other useful carbohydrates include starch, cellulose, and combinations thereof.

In preferred embodiments, the carbonaceous material is characterized such that when the carbonaceous material is incorporated into an electrode composition of a lithium-ion cell, the cell exhibits a reversible capacity of at least about 450 mAH/g (more preferably at least about 500 mAH/g) of carbonaceous material and an irreversible capacity no greater than about 100 mAH/g (preferably no greater than about 50 mAH/g) of carbonaceous material, the capacities being measured up to the point of plating of metallic lithium on the surface of the carbonaceous material.

The invention provides a simple and effective method for preparing carbonaceous materials that are essentially free of species capable of irreversibly reacting with lithium, offering the advantage of minimized irreversible capacity and maximized reversible capacity per gram of carbonaceous material when used as an electrode composition in a cell.

Other features and advantages of the invention will be apparent from the following description of the preferred embodiments thereof, and from the claims.

DESCRIPTION OF THE PREFERRED EMBODIMENTS

Figure 1:
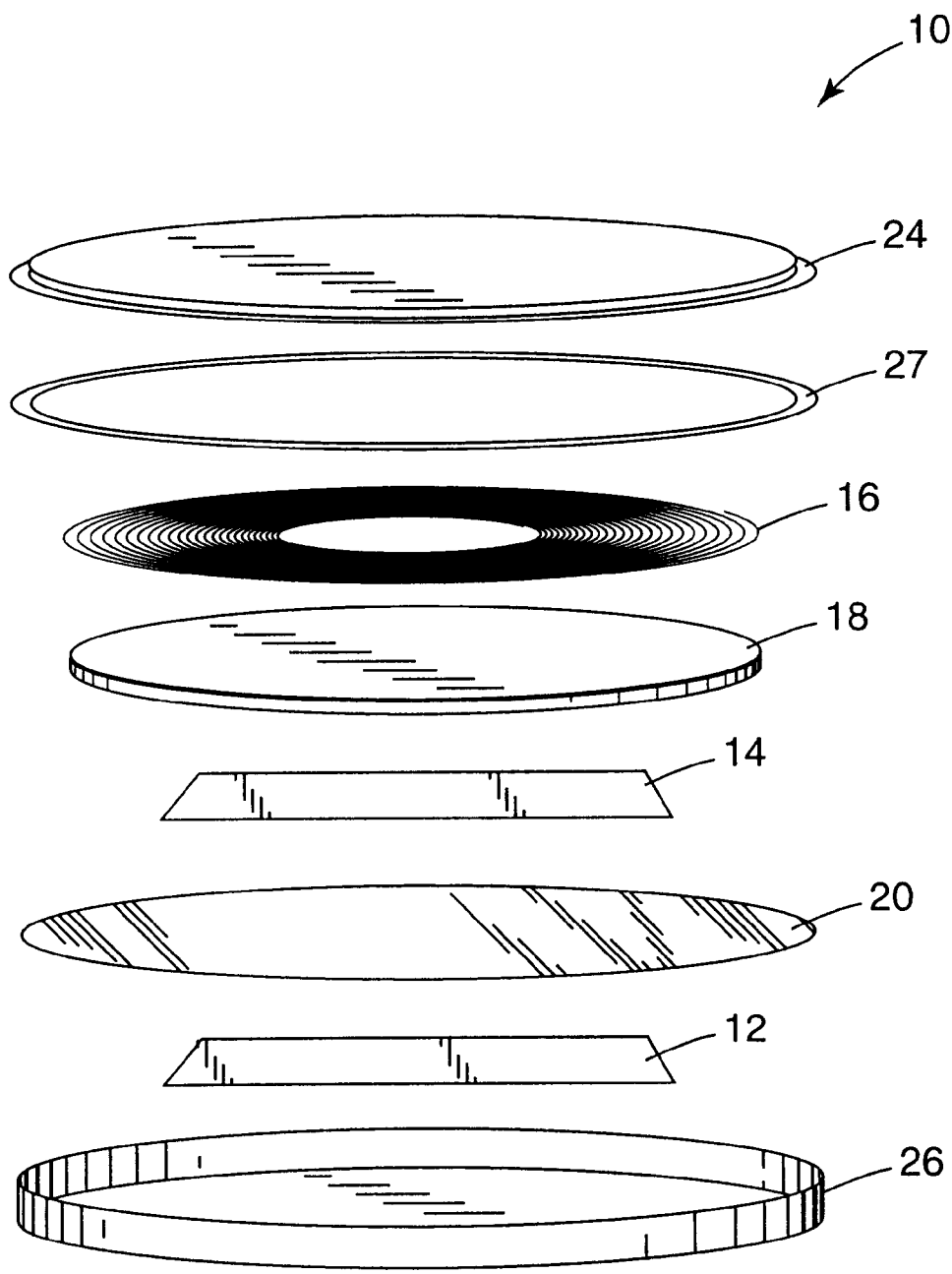
FIG. 1 is an exploded perspective view of an electrochemical cell used to test various electrode compositions.

Carbonaceous materials prepared by the method described herein are essentially free of species capable of irreversibly reacting with lithium. Examples of such species include covalently bonded functional groups, chemisorbed species, and physisorbed species.

One measure of the presence of species capable of irreversibly reacting with lithium is the amount of irreversible capacity per gram of carbonaceous material. In lithium cells, irreversible capacity is the value obtained by subtracting the capacity of the fully charged carbonaceous material from the capacity of the fully discharged carbonaceous material. Reversible capacity of lithium cells is calculated herein by averaging the capacity of the first charge and the second discharge. The method described herein minimizes the irreversible capacity of the carbonaceous material such that when the carbonaceous material is incorporated into a lithium-ion cell, the cell exhibits an irreversible capacity no greater than about 140 mAH/g (preferably no greater than about 100 mAH/g, more preferably no greater than about 50 mAH/g) of carbonaceous material, while maintaining a reversible capacity of at least about 400 mAH/g (preferably at least about 450 mAH/g, more preferably at least about 500 mAH/g) of carbonaceous material. These capacity values are obtained by measuring the capacity up to the point of plating of metallic lithium on the surface of the carbonaceous material.

In lithium cells, plating of metallic lithium occurs when the chemical potential of the lithium inserted into the carbonaceous material equals that of lithium metal, such that no additional lithium can be inserted into the carbonaceous material. At this point, the lithium transferred to the carbon electrode electrodeposits as a metal on the surface of the carbon. This point is manifested by a slight rise in cell voltage even though the cell is still discharging. Once plating commences, the cell current can be reversed, which charges the cell. During charging, the metallic lithium that was plated is first stripped and then the inserted lithium is removed from the carbon. This property is further discussed in Y. Liu et al, "Mechanism of Lithium Insertion in Hard Carbons Prepared by Pyrolysis of Epoxy Resins," *Carbon*, 34:2, pp. 193–200 (1996).

The absence of surface species can be detected by X-ray photoelectron spectroscopy ("XPS"), also known as electron spectroscopy for chemical analysis ("ESCA"). XPS analyzes the elemental composition of the outermost surface (i.e., approximately 10 to 50 Å) of a specimen. XPS can be used to detect all elements in the periodic table except helium and hydrogen. The surface of carbonaceous materials prepared by the method described herein preferably exhibits between about 98.5% and 100% carbon and preferably less than 1.5%, more preferably less than 1.0% noncarbon elements when analyzed by XPS.

The carbonaceous materials are prepared by contacting a pyrolyzed organic material with hydrocarbon gas for a period and at a temperature sufficient to produce carbonaceous materials that are essentially free of species capable of irreversibly reacting with lithium. The method encompasses contacting a previously pyrolyzed organic material with hydrocarbon gas at elevated temperatures, e.g, temperatures above 500° C. The method also encompasses pyrolyzing the organic material in the presence of hydrocarbon gas. The pyrolyzed material can be further processed by heat soaking at an elevated temperature in the presence of hydrocarbon gas.

The pyrolyzed material preferably is not exposed to air prior to contact with hydrocarbon gas.

Hydrocarbon gas treatment is preferably performed under a controlled atmosphere to prevent the formation of undesired oxides of carbon. A suitable reaction system consists of a reaction tube having sealed inlet and outlet connections installed in a conventional tube furnace to control the atmosphere present in the furnace tube. Valves can be added to facilitate the flow of hydrocarbon gas through the furnace tube.

Hydrocarbon gas treatment can also be conducted at temperatures and at temperature ramp rates that are sufficient to drive off undesirable contaminants and noncarbon components such as water, oxygen, and silicon. The elevated temperatures at which the hydrocarbon gas is brought into contact with the surface of the pyrolyzed organic material are in the range of about 500° C. to about 1200° C., more preferably from about 700° C. to about 1100° C., with temperatures from about 900° to about 1000° C. being most preferred.

Similar conditions are used during pyrolysis processes. Typical pyrolysis conditions include temperatures in the range of 900° C. to 1200° C., preferably 1000° C.

Particularly useful pyrolyzed organic materials have extensive surface area accessible to the hydrocarbon gas. Microporous, nanoporous, or powdered pyrolized organic materials allow the hydrocarbon gas to permeate the pyrolyzed material and contact the entire surface area of the pyrolyzed material.

Suitable organic precursors are those organic materials that can be pyrolyzed to a state where little hydrogen remains. Examples of suitable organic materials include phenolic resins, epoxy resins, lignin, and carbohydrates.

Examples of suitable epoxy resins include bisphenol A-based epoxies and epoxy novolac resins.

Suitable phenolic resins include, for example, those phenolic resins of the novolac or resole type.

Examples of suitable carbohydrates include sugars such as monosaccharides (simple sugars), disaccharides (more complex sugars including sucrose), and polysaccharides, the latter comprising the entire starch and cellulose families. Starch is a polymer of α-D-glucose, while cellulose is a polymer of β-D-glucose.

Examples of suitable cellulosic materials include oak, maple, walnut shell, filbert shell, almond shell, cotton, and straw.

Organic materials are often treated prior to pyrolysis to facilitate the formation, upon pyrolysis, of materials consisting solely of carbon and hydrogen. Sugar, for example, is often "dewatered" and then powdered in a grinding operation prior to being subjected to pyrolysis. Methods for treating organic materials prior to pyrolysis are well known in the art and are described, for example, in Weibing Xing and J. R. Dahn, "Study of Irreversible Capacities for Li Insertion in Hard and Graphitic Carbons," *J. Electrochem. Soc.*, 144:4, April 1997, incorporated herein by reference.

The hydrocarbon gas is essentially free of oxygen, silicon, and components other than hydrogen and carbon. The hydrocarbon gas may be derived from hydrocarbons that are gases at room temperature or become gases once heated, e.g, alkanes, alkenes, alkynes, branched and straight chain aliphatic hydrocarbons, and aromatic hydrocarbons. Examples of useful hydrocarbons include methane, ethane, propane, butane, ethylene, propylene, butylene, acetylene, benzene, and alkyl substituted benzenes, e.g., toluene, and cumene.

The carbonaceous materials formed by the methods described herein are suitable for use as an electrode, e.g., the negative electrode (i.e., anode) in a lithium-ion cell.

The invention will now be described further by way of the following examples.

EXAMPLES
ELECTROCHEMICAL CELL PREPARATION

Electrodes were prepared as follows: Carbon powder (90 wt %) (prepared as described in each of the Examples below), Super S carbon black (5 wt %), and polyvinylidene fluoride (PVDF) dissolved in N-methylpyrrolidone were thoroughly mixed by stirring in a beaker at 30° C. for 15 minutes to form a slurry. The slurry was then coated in a thin layer (about 100 um) on a copper foil substrate. The electrodes were dried at 110° C. for 3 hours in air and then pressed at about 3000 kPa pressure between flat plates.

The electrodes were taken into an argon filled glove box where the electrochemical cell was constructed.

An exploded perspective view of the electrochemical cell 10 is shown in FIG. 1. A stainless steel cap 24 and oxidation resistant case 26 contain the cell and serve as the negative and positive terminals respectively. The cathode 12 was the electrode prepared as described above. The anode 14 was a lithium foil having a thickness of 125 micrometers; the anode also functioned as a reference electrode. The cell featured 2325 coin-cell hardware, equipped with a spacer plate 18 (304 stainless steel) and a disc spring 16 (mild steel). The disc spring was selected so that a pressure of about 15 bar would be applied to each of the cell electrodes when the cell was crimped closed. The separator 20 was a Celgard 2400 microporous polypropylene film (Hoechst- Celanese), which had been wetted with a 1M solution of $LiPF_6$ dissolved in a 30:70 volume mixture of ethylene carbonate/diethyl carbonate (Mitsubishi Chemical). A gasket 27 is used as a seal and also serves to separate the two terminals.

ELECTROCHEMICAL CELL TESTING

The electrochemical cells were placed in thermostats at 30+/−0.1° C. Cells were discharged with a constant current of 18.5 mA/g to ensure a near-equilibrium state in the cells. This current corresponds to the intercalation of Δx=1 in $Li_xC_6$ in 20 hours. The cells were discharged below zero volts (to about −0.02 V), until a small increase in voltage with time was observed, which corresponded to the initiation of the plating of metallic lithium on the carbon surface. At this point, the electrode was "full". The current direction was then reversed and the lithium was removed. Charging of the cells was considered complete when the cell voltage reached 3 V. The portions of the voltage curve due to lithium plating and stripping were not included in the reversible and irreversible capacity calculations.

Reversible capacity was calculated by averaging the first charge and the second discharge. Irreversible capacity was calculated by taking the difference between the first discharge and the first charge.

Example 1

100 g sucrose (Aldrich Chemical Co.) was heated to 185° C. in air for 12 hours until a brown solid mass formed. This process is referred to as "dewatering." 67 g of the brown solid mass was recovered and powdered for about 15 minutes using a motorized mortar and pestle (Retsch model RM-O).

A 6 g sample of the powdered material was then heated to 900° C. using a Lindberg tube furnace equipped with a 1 inch diameter quartz furnace tube fitted with Ultratorr fittings (Swagelock, Co.) at each end. Valves were connected at each end of the furnace tube so that a vacuum, argon flow, or hydrocarbon gas dosing could be achieved. After the powder had been loaded into the furnace tube, the sample was maintained under vacuum for 12 hours. Ethylene gas (Canadian Liquid Air) was then passed at a rate of 200 cc/min through the fittings in the sealed end caps. The ethylene flow continued throughout the synthesis.

The heating profile was as follows: from 100° C. to 200° C. at 50° C./min, from 200° C. to 450° C. at 1° C./min, and from 450° C. to 900° C. at 10° C./min, followed by a 1 hour soak at 900° C. The sample was then cooled to room temperature in about 1 hour in ethylene.

Within 24 hours of the preparation of the material, an electrochemical cell was constructed according to the procedure described above using, as the cathode, samples prepared according to Example 1. Reversible capacity and irreversible capacity were determined as described above and the results are reported in Table 1.

Examples 2–4

6 grams of the powdered material prepared as described in Example 1 was heated to 1100° C. under vacuum using the same heating profile as Example 1. The sample was soaked at 1100° C. for 1 hour. After the samples had cooled to room temperature, ethylene gas was passed through the furnace tube at a rate of about 200 cc/min. While the ethylene flow continued, the samples were heated to the following treatment temperatures: 300° C. (Example 2), 500° C. (Example 3), and 700° C. (Example 4). The heating profile was as follows: from 100° C. to the treatment temperature at a rate of 50° C./min, followed by a one hour soak at the treatment temperature. The samples were then cooled to room temperature in about 1 hour.

Within 24 hours of the preparation of the materials of Examples 2–4, electrochemical cells were constructed according to the procedure described above, using, as the cathode, the materials of Examples 2–4. Reversible capacity and irreversible capacity were determined as described above and the results are reported in Table 1.

Example 5

Example 5 was prepared as in Example 4 except that the ethylene flow was stopped and the furnace tube was sealed once the furnace tube had been filled with ethylene at room temperature to a pressure of 5 psig (0.33 Atmosphere). Within 24 hours of the preparation of the material of Example 5, electrochemical cells were constructed according to the procedure described above, using, as the cathode, the material of Example 5. Reversible capacity and irreversible capacity were determined as described above and the results are reported in Table 1.

Example 6

Example 6 was prepared as in Example 5 except that the treatment temperature was 1100° C. Within 24 hours of the preparation of the material of Example 6, electrochemical cells were constructed according to the procedure described above, using, as the cathode, the material of Example 6. Reversible capacity and irreversible capacity were determined as described above and the results are reported in Table 1.

Examples 7–9

100 g glucose (Aldrich Chemical Co.) was heated to 185° C. in air for 12 hours until a brown solid mass was formed. The solid mass was then powdered for 15 minutes using a motorized mortar and pestle (Retsch model RM-O).

Examples 7–9 were then prepared using the powdered glucose material and the procedure set forth in Example 5 except that the ethylene treatment temperatures were as follows: 1100° C. (Example 7), 900° C. (Example 8), 700° C. (Example 9).

Within 24 hours of the preparation of the materials of Examples 7–9 electrochemical cells were constructed according to the procedure described above, using, as the cathode, the materials of Examples 7–9. Reversible capacity and irreversible capacity were determined as described above and the results are reported in Table 1.

TABLE 1

| | | Soak | Ethylene Exposure | | | | |
|---|---|---|---|---|---|---|---|
| Sample | Material | Temp. (° C.) | Temp (° C.) | Flow Rate (cc/min) | Method of Exposure | Rev. Cap. mAh/g | Irrev. Cap. mAh/g |
| 1 | sucrose | 900 | 900 | 200 | During Pyrolysis | 516 | 52 |
| 2 | sucrose | 1100 | 300 | 200 | Post Pyrolysis | 537 | 131 |
| 3 | sucrose | 1100 | 500 | 200 | Post Pyrolysis | 548 | 136 |
| 4 | sucrose | 1100 | 700 | 200 | Post Pyrolysis | 571 | 60 |
| 5 | sucrose | 1100 | 700 | 0 | Post Pyrolysis | 600 | 71 |
| 6 | sucrose | 1100 | 1100 | 0 | Post Pyrolysis | 416 | 14 |
| 7 | glucose | 1100 | 1100 | 0 | Post Pyrolysis | 430 | 60 |
| 8 | glucose | 1100 | 900 | 0 | Post Pyrolysis | 530 | 90 |
| 9 | glucose | 1100 | 700 | 0 | Post Pyrolysis | 530 | 120 |

Other embodiments are within the following claims.

What is claimed is:

1. A method for making a carbonaceous material suitable for use as an electrode composition comprising:

contacting pyrolyzed organic material with hydrocarbon gas for a period and at a temperature sufficient to produce a carbonaceous material characterized such that when said carbonaceous material is incorporated into an electrode composition of a lithium-ion cell, the cell exhibits a reversible capacity of at least about 400 mAH/g of carbonaceous material and an irreversible capacity, as measured by the amount of lithium that cannot be fully recovered after the first charge of the lithium-ion cell, of no greater than about 140 mAH/g of carbonaceous material, said capacities being measured up to the point of plating of metallic lithium on the surface of the carbonaceous material.

2. The method of claim 1, wherein said pyrolyzed organic material is contacted with said hydrocarbon gas at a temperature of at least about 500° C.

3. The method of claim 1, wherein said pyrolyzed organic material is contacted with said hydrocarbon gas at a temperature of at least about 700° C.

4. The method of claim 1, wherein said pyrolyzed organic material is contacted with said hydrocarbon gas at a temperature of at least about 900° C.

5. The method of claim 1, wherein said pyrolyzed organic material is contacted with said hydrocarbon gas at a temperature of no greater than about 1200° C.

6. The method of claim 1, wherein said pyrolyzed organic material is contacted with said hydrocarbon gas at a temperature between about 500° C. and about 1200° C.

7. The method of claim 1, wherein said pyrolyzed organic material is contacted with said hydrocarbon gas at a temperature between about 700° C. and about 1100° C.

8. The method of claim 1, wherein said pyrolyzed organic material is contacted with said hydrocarbon gas at a temperature between about 900° C. and about 1000° C.

9. The method of claim 1, wherein said hydrocarbon gas is selected from the group consisting of methane, ethane, propane, butane, ethylene, propylene, butylene, acetylene, benzene, and combinations thereof.

10. The method of claim 1, wherein said hydrocarbon gas comprises ethylene.

11. The method of claim 1, wherein said organic material is selected from the group consisting of carbohydrates, phenolic resins, epoxy resins, lignin, and combinations thereof.

12. The method of claim 1, wherein said organic material comprises a carbohydrate selected from the group consisting of starch, cellulose, and combinations thereof.

13. The method of claim 1, wherein said organic material is selected from the group consisting of novolac resins, resole resins, and combinations thereof.

14. The method of claim 1, wherein said organic material comprises a carbohydrate selected from the group consisting of glucose, sucrose, lactose, fructose, maltose and combinations thereof.

15. The method of claim 1, wherein said organic material comprises glucose.

16. The method of claim 1, wherein said organic material comprises cellulose.

17. The method of claim 1, wherein said carbonaceous material is characterized such that when said carbonaceous material is incorporated into an electrode composition of a lithium-ion cell, the cell exhibits a reversible capacity of at least about 450 mAH/g of carbonaceous material and an irreversible capacity no greater than about 100 mAH/g of carbonaceous material, said capacities being measured up to the point of plating of metallic lithium on the surface of the carbonaceous material.

18. The method of claim 1, wherein said carbonaceous material is characterized such that when said carbonaceous material is incorporated into an electrode composition of a lithium-ion cell, the cell exhibits a reversible capacity of at least about 500 mAH/g of carbonaceous material and an irreversible capacity no greater than about 100 mAH/g of carbonaceous material, said capacities being measured up to the point of plating of metallic lithium on the surface of the carbonaceous material.

19. The method of claim 1, wherein said carbonaceous material is characterized such that when said carbonaceous material is incorporated into an electrode composition of a lithium-ion cell, the cell exhibits a reversible capacity of at least about 450 mAH/g of carbonaceous material and an irreversible capacity no greater than about 50 mAH/g of carbonaceous material, said capacities being measured up to the point of plating of metallic lithium on the surface of the carbonaceous material.

20. The method of claim 1, wherein said carbonaceous material is characterized such that when said carbonaceous material is incorporated into an electrode composition of a lithium-ion cell, the cell exhibits a reversible capacity of at least about 500 mAH/g of carbonaceous material and an irreversible capacity no greater than about 50 mAH/g of carbonaceous material, said capacities being measured up to the point of plating of metallic lithium on the surface of the carbonaceous material.

21. A method for making a carbonaceous material suitable for use as an electrode composition comprising:

contacting pyrolyzed organic material with a hydrocarbon gas comprising ethylene for a period and at a temperature sufficient to produce a carbonaceous material characterized such that when said carbonaceous material is incorporated into an electrode composition of a lithium-ion cell, the cell exhibits a reversible capacity of at least about 400 mAH/g of carbonaceous material, and an irreversible capacity no greater than about 140 mAH/g of carbonaceous material, said capacities being measured up to the point of plating of metallic lithium on the surface of the carbonaceous material.

22. The method of claim 21, wherein said pyrolyzed organic material is contacted with said hydrocarbon gas at a temperature of at least about 500° C.

23. The method of claim 21, wherein said pyrolyzed organic material is contacted with said hydrocarbon gas at a temperature of at least about 700° C.

24. The method of claim 21, wherein said pyrolyzed organic material is contacted with said hydrocarbon gas at a temperature of at least about 900° C.

25. The method of claim 21, wherein said pyrolyzed organic material is contacted with said hydrocarbon gas at a temperature of at least about 1200° C.

26. The method of claim 21, wherein said pyrolyzed organic material is contacted with said hydrocarbon gas at a temperature of between about 500° C. and about 1200° C.

27. The method of claim 21, wherein said pyrolyzed organic material is contacted with said hydrocarbon gas at a temperature of between about 700° C. and about 1100° C.

28. The method of claim 21, wherein said pyrolyzed organic material is contacted with said hydrocarbon gas at a temperature of between about 900° C. and about 1000° C.

29. The method of claim 21, wherein said carbonaceous material is characterized such that when said carbonaceous material is incorporated into an electrode composition of a lithium-ion cell, the cell exhibits a reversible capacity of at least about 450 mAH/g of carbonaceous material and an irreversible capacity no greater than about 100 mAH/g of carbonaceous material, said capacities being measured up to the point of plating of metallic lithium on the surface of the carbonaceous material.

30. The method of claim 21, wherein said carbonaceous material is characterized such that when said carbonaceous material is incorporated into an electrode composition of a lithium-ion cell, the cell exhibits a reversible capacity of at least about 500 mAH/g of carbonaceous material and an irreversible capacity no greater than about 100 mAH/g of carbonaceous material, said capacities being measured up to the point of plating of metallic lithium on the surface of the carbonaceous material.

31. The method of claim 21, wherein said carbonaceous material is characterized such that when said carbonaceous material is incorporated into an electrode composition of a lithium-ion cell, the cell exhibits a reversible capacity of at least about 450 mAH/g of carbonaceous material and an irreversible capacity no greater than about 50 mAH/g of carbonaceous material, said capacities being measured up to the point of plating of metallic lithium on the surface of the carbonaceous material.

32. The method of claim 21, wherein said carbonaceous material is characterized such that when said carbonaceous material is incorporated into an electrode composition of a lithium-ion cell, the cell exhibits a reversible capacity of at least about 500 mAH/g of carbonaceous material and an irreversible capacity no greater than about 50 mAH/g of carbonaceous material, said capacities being measured up to the point of plating of metallic lithium on the surface of the carbonaceous material.

33. A method for making a carbonaceous material suitable for use as an electrode composition comprising:
    contacting pyrolyzed organic material selected from the group consisting of pyrolyzed novolac resins, resole resins, and combinations thereof, with hydrocarbon gas for a period and at a temperature sufficient to produce a carbonaceous material characterized such that when said carbonaceous material is incorporated into an electrode composition of a lithium-ion cell, the cell exhibits a reversible capacity of at least about 400 mAH/g of carbonaceous material and an irreversible capacity no greater than about 140 mAH/g of carbonaceous material, said capacities being measured up to the point of plating of metallic lithium on the surface of the carbonaceous material.

34. A method for making a carbonaceous material suitable for use as an electrode composition comprising:
    contacting pyrolyzed organic material comprising pyrolyzed glucose with hydrocarbon gas for a period and at a temperature sufficient to produce a carbonaceous material characterized such that when said carbonaceous material is incorporated into an electrode composition of a lithium-ion cell, the cell exhibits a reversible capacity of at least about 400 mAH/g of carbonaceous material and an irreversible capacity no greater than about 140 mAH/g of carbonaceous material, said capacities being measured up to the point of plating of metallic lithium on the surface of the carbonaceous material.

* * * * *